United States Patent [19]

Grohe

[11] 4,320,669
[45] Mar. 23, 1982

[54] TWO DEGREE OF FREEDOM GYRO HAVING AN AXIAL GAP PERMANENT MAGNET MOTOR

[75] Inventor: Lester R. Grohe, East Weymouth, Mass.

[73] Assignee: Northrop Corporation, Los Angeles, Calif.

[21] Appl. No.: 17,446

[22] Filed: Mar. 5, 1979

[51] Int. Cl.³ .................. G01C 19/08; G01C 19/28; G01C 19/30

[52] U.S. Cl. .................. 74/5.37; 73/504; 74/5.46; 74/5.6 D; 74/5.7

[58] Field of Search .............. 74/5.7, 5.37, 5.34, 74/5.46, 5.41, 5.6 D; 318/331, 314, 318; 310/67, 74, 181, 267; 73/504; 33/321

[56] References Cited

U.S. PATENT DOCUMENTS

| | | | |
|---|---|---|---|
| 3,025,708 | 3/1962 | Slater et al. | 74/5.7 X |
| 3,127,774 | 4/1964 | Fischer et al. | 74/5.34 X |
| 3,251,233 | 5/1966 | Duncan et al. | 74/5.6 D X |
| 3,320,819 | 5/1967 | Riordan et al. | 33/321 X |
| 3,324,733 | 6/1967 | Younkin | 74/5.7 |
| 3,354,726 | 11/1967 | Krupick et al. | 74/5.6 D X |
| 3,603,161 | 9/1971 | Schwarz | 74/5.6 |
| 3,611,815 | 10/1971 | Fischell | 74/5.7 |
| 3,664,199 | 5/1972 | Lahde | 74/5.6 |
| 3,845,995 | 2/1973 | Wehde | 308/10 |
| 3,908,470 | 9/1975 | Evans et al. | 74/5.6 D |
| 3,974,702 | 8/1976 | Brodersen | 74/5.6 B |
| 3,999,092 | 12/1976 | Whiteley | 310/156 |
| 4,000,660 | 1/1977 | Brodersen | 74/5.43 |
| 4,072,874 | 2/1978 | Arnold | 310/268 |
| 4,093,897 | 6/1978 | Fujita et al. | 318/318 |

FOREIGN PATENT DOCUMENTS

2522827 12/1976 Fed. Rep. of Germany ........ 74/5.46

OTHER PUBLICATIONS

"Development of Back EMF Control Electronics for a PM Gyro Wheel", Fulton 6/76, The Charles Stark Draper Lab., Inc.

*Primary Examiner*—Rodney H. Bonck
*Attorney, Agent, or Firm*—Kenway & Jenney

[57] ABSTRACT

A two degree of freedom gyro having an axial gap, permanent magnet motor. The gyro motor includes a stator having two sets of series connected coils wound in quadrature. The motor further includes a rotor which is adapted for continuous rotation about a spin axis, and for rotational displacements about the two orthogonal input axes. The rotor includes a set of permanent magnets supported so that the moment of each of the magnets is substantially parallel to the spin axis, with the magnetic moment of adjacent magnets being oppositely directed. The rotor is positioned with respect to the stator so that flux from the magnets is coupled to the coils. The rotor also includes a return ring for establishing a magnetic flux return path for completing a circuitous path for flux passing through the coil. An excitation network for the coils detects back emf in the respective coils, and generates control signals for driving alternating currents in the respective sets of coils. The alternating currents have a 90° relative phase shift and are in phase with the detected back emf. The gyro also includes network for detecting rotational displacement of the rotor about the input axes, and for generating balance control signals representative of such displacements. Torquers are responsive to these balance control signals to torque the rotor to maintain the spin axis of the rotor substantially coaxial with the spin reference axis.

11 Claims, 4 Drawing Figures

TWO DEGREE OF FREEDOM GYRO HAVING AN AXIAL GAP PERMANENT MAGNET MOTOR

REFERENCE TO RELATED APPLICATION

The subject mater of this application is related to that of my U.S. patent application Ser. No. 017,352, filed on even data herewith.

BACKGROUND OF THE INVENTION

This invention relates to inertial instruments, and more particularly to gyro configurations for inertial instruments.

The conventional wheel spin motor for both precision navigation grade and tactical grade gyros is a multi-phase hysteresis synchronous motor. This motor form includes wheel, or rotor, having a ring of high hysteresis magnetic steel which is torqued from a standstill to synchronous speed by interacting with a two- or three-phase lap- or wave-wound laminated electric motor stator. The ring is driven by exciting the stator windings from a fixed frequency supply reference.

The resultant motor is self-starting as the result of the hysteresis torques in the steel rotor ring. At synchronization, the rotor and stator magnetic fields are rotating at the same speed, although the rotor magnetic ring is no longer being dragged around its hysteresis curve, but rather maintains synchronous speed by virtue of the magnetic poles formed in the ring. New poles are formed each time the wheel is started. However, the ring is generally so magnetically soft that precise form of the rotor magnetic poles is a complicated function of the magnetic history of the stator flux and rotor position. In typical gyro applications, the magnetic history contributes substantially to gyro drift. In order to alleviate such problems, it is often necessary to employ complex control voltage amplitude sequences to the stator for systematically randomizing the rotor magnitization.

Although relatively simple in construction, the prior art hysteresis motors are relatively low in electrical efficiency (typically on the order of 60%). In addition to the efficiency problem, hysteresis motors are characterized by the following additional problems: Powerful attractive forces between stator and rotor require strict control air gap concentricity; multilaminated construction is needed to keep electrical losses as low as possible; and small air gaps are required to insure maximum efficiency (with resultant extreme tolerance requirements on the component parts).

Other prior art approaches utilize induction motors for driving gyro wheels. However, these systems are relatively inefficient particularly in view of eddy current losses in laminations and in addition, the eddy current losses provide a relatively high temperature environment which typically result in volatile material boiling off the windings which condenses on bearing surfaces. In addition, induction motors are characterized by relatively high slippage which results in the wheel not being strictly synchronous to the power supply. These induction motor configurations are characterized by relatively high power consumption.

In more recent developments, permanent magnet gyro wheel spin motors have been developed wherein a hard permanent magnetic rotor is used in a radial gap motor configuration. In this configuration, the primary change from conventional hysteresis motors is the substitution of a smooth ring of hard magnetic material (such as Alnico) for the hysteresis rotor. By way of example, the hysteresis ring of a GI-G6 gyro (Manufactured by Northrop Corporation, Norwood, Mass.) wheel motor may be replaced with an Alnico permanent magnet ring, together with a multiphased stator winding supported by a non-magnetic material. A further example of such a motor is described by D. E. Fulton in Report R-980, The Charles Stark Draper Laboratory, Inc., June, 1976, Cambridge, Mass. In this configuration, the permanent magnet rotor is controlled to rotate at or very near the synchronous speed, for example, by an auxiliary induction motor run at a fixed-frequency. A closed loop network controls the amplitude of a stator field by continuously sensing the angle of the back emf (representative of the permanent magnet rotor position) to continuously control the angle of the state of magnetic field, and thereby commutate the motor.

Since the closed loop commutation circuit slaves the frequency angle of the stator current to the rotor position, full torque can be applied to the rotor at any frequency that provides enough back emf voltage to drive the back emf detection circuit. In this closed loop configuration, the torque angle can be operated at 90°, i.e. the difference between the stator and the rotor of magnetic field angles.

While this latter approach is relatively efficient (e.g. on the order of 90%), and avoids configurations having strong magnetic forces between stator and rotor, the radial gap permanent magnet motor of the prior art is a relatively complex physical configuration with relatively high difficulty of access to the component parts. Furthermore, the known radial gap permanent magnet motors are not well suited for certain applications such as wheel spin motors for free rotor (i.e. two degree of freedom) gyros.

It is an object of the present invention to provide a relatively compact permanent magnet motor.

Another object is to provide an axial gap, permanent magnet motor.

Yet another object is to provide a free rotor gyro having an axial gap permanent magnet wheel spin motor.

SUMMARY OF THE INVENTION

Briefly, the present invention is directed to a free rotor (or two degree of freedom) gyro having an axial gap permanent magnet wheel spin motor. The gyro includes a stator affixed to the gyro housing. The stator has two sets of series connected coils wound in quadrature. Each set of coils is disposed in an annular configuration about the same spin reference axis (Z axis) and substantially parallel to a plane defined by two (X and Y) input axes. The X, Y and spin reference axes are mutually orthogonal and have a common point of intersection. The principal axis of each coil is substantially parallel to the Z axis.

The gyro further includes a wheel, or rotor, which is adapted for continuous rotation about a spin axis, and limited rotational displacements about the two input axes (X and Y axes). The rotor includes a set of permanent magnets in an annular support member so that the magnets are disposed in a substantially annular configuraton about the spin axis. The annular configuration of magnets has substantially the same mean radius as the annular configuraton of coils. The magnetic moment of each of the magnets in the set is substantially parallel to the spin axis, with the magnetic moments of the adjacent magnets being oppositely directed.

The rotor is positioned with respect to the stator with the annular configuration of magnets adjacent to the annular configuration of coils. As a result, flux from the magnets is coupled to the coils.

In addition, the rotor includes a return ring (or back iron) of relatively high permeability magnetic material arranged to establish a magnetic flux return path for completing a circuitous path for flux passing through the coils. In one form of the invention, the magnets are all on one side of the coils and the return ring includes a first annular section coupled to the poles of the magnets farthest from the coils, and a second annular section adjacent to the faces of the coils farthest from the magnets. In addition, the rotor is arranged to establish axial gaps between the faces of the coils closest to the magnets and the magnets themselves, and also between the faces of the coils farthest from the magnets from the return ring. In this form the return path for flux through a coil includes a first magnet adjacent to the coil, the second section of the return ring, the magnets adjacent to the first magnet, the coils adjacent to said adjacent magnets and the first section of the return ring. In an alternate form of the invention, the return ring may include a third annular section connecting the first and second sections. In the latter form, the return path for flux through a coil includes a first magnet adjacent to the coil, and the second, third and first sections of the return ring, respectively.

In the preferred form of the invention, the rotor is coupled to the gyro housing by way of a spherical gas bearing. To establish this spherical bearing configuration, the rotor includes a bearing outer member and an annular member (for supporting for the set of magnets) affixed to the bearing outer member. The bearing outer member is hollow and has a substantially spherical concave inner surface (including Whipple grooves) with the center of curvature located at the point of intersection of the X, Y and Z axes. The bearing inner member has a substantially spherical outer surface which is of a smaller radius than the inner surface of the bearing outer member. The bearing inner member is affixed to the gyro housing by shafts (coaxial with the Z axis) so that its spherical surface is within the concave surface of the bearing outer member. In this configuration, a gas medium is provided between the inner and outer surfaces of the bearing members so that the rotor is free to rotate continuously about the Z axis, and also has freedom to be rotationally displaced about the X and Y axes.

The gyro further includes an excitation network for the two sets of coils including a network for detecting back emf in the respective sets of coils and for generating control signals related to the detected back emf for driving alternating currents in the respective sets of coils. The currents having a 90° relative phase shift and are in-phase with the detailed back emf in the respective sets of coils.

The gyro also includes detection networks for detecting rotational displacement of the rotor about the X and Y axes relative to the gyro housing and for generating balance control signals representative of such displacements. Torquers connected to the housing member are responsive to these balance control signals to apply torques to the rotor about the X and Y axes to maintain the rotor substantially in the X-Y plane (i.e. nulling the displacements). Thus, a closed loop servo network restrains the rim of the rotor to be substantially in a plane perpendicular to the Z axis. Displacements of the rotor out of the X-Y plane result in an error signal being generated by the detection networks. These signals are processed conventionally so that the currents applied to the torquers produce a torque on the rotor about the X-Y plane in a direction to oppose the product of the wheel angular momentum and the input angular velocity of the gyro housing. The servo loop continues to drive the rotor back towards the X-Y plane until the error signal is nulled. When the error signal is nulled, the spin reference and spin axes are substantially coaxial.

With this configuration, the inertial wheel, or rotor, is driven to synchronous speed about the spin axis (Z axis) by the axial air gap permanent magnet motor. The motor has a high electrical efficiency, e.g. on the order of 95%. Because there are no axial magnetic attractive forces from the stator to the rotor, there is minimum uncertainty torque acting on the spinning rotor. Furthermore, with the "pancake" configuration of the axial gap motor, the polar moment of inertia may approach the ideal where the spin moment of inertia is two times the input moment of inertia, thereby providing optimal suppression of the tendency to nutate.

There is only a single moving part in the gyro, i.e. the rotor assembly. The entire gyro unit may be hermetically sealed and filled with low viscosity gas, preferably hydrogen. The gas provides the hydrodynamic medium for the spin bearing support and also serves to conduct heat to the outer walls of the gyro housing. Thus, all of the electrical windings may be enclosed in a non-organic "can" so that there is no free surface of an organic material that might cause bearing life-shortening contamination.

The permanent magnet (PM) motor is relatively unaffected by the disturbances which adversely affect the hysteresis motor. Because the rotor of the PM motor is magnetically hard, there is a relatively high toleration of stator flux and transient power supply disturbances. In addition, stator construction is relatively simple compared with that for hysteresis motors in that there is no requirement for either iron laminations or slot seals, but only coil assemblies for the phases and support for the coils. Typically, there is no iron in the core and thus there are minimal coil losses to lower motor efficiency. The back iron which provides a magnetic return path for the PM motor rotates at synchronous speed with the gyro wheel and therefore, no magnetic drag effects are imposed on the free rotor.

In the closed loop servo configuration, the permanent magnet motor is characterized by relatively high efficiencies, e.g. on the order of 95%. Such efficiencies are due to the fact that there is minimal copper loss for a given torque when the torque angle equals 90° (as is possible with the present invention). In contrast, the hysteresis motor typically operates with a torque angle of 30° or less. In summary, the motor of the present invention provides relatively low volume weight and power ($I^2R$) losses for a given torque requirement compared with the prior art configurations.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
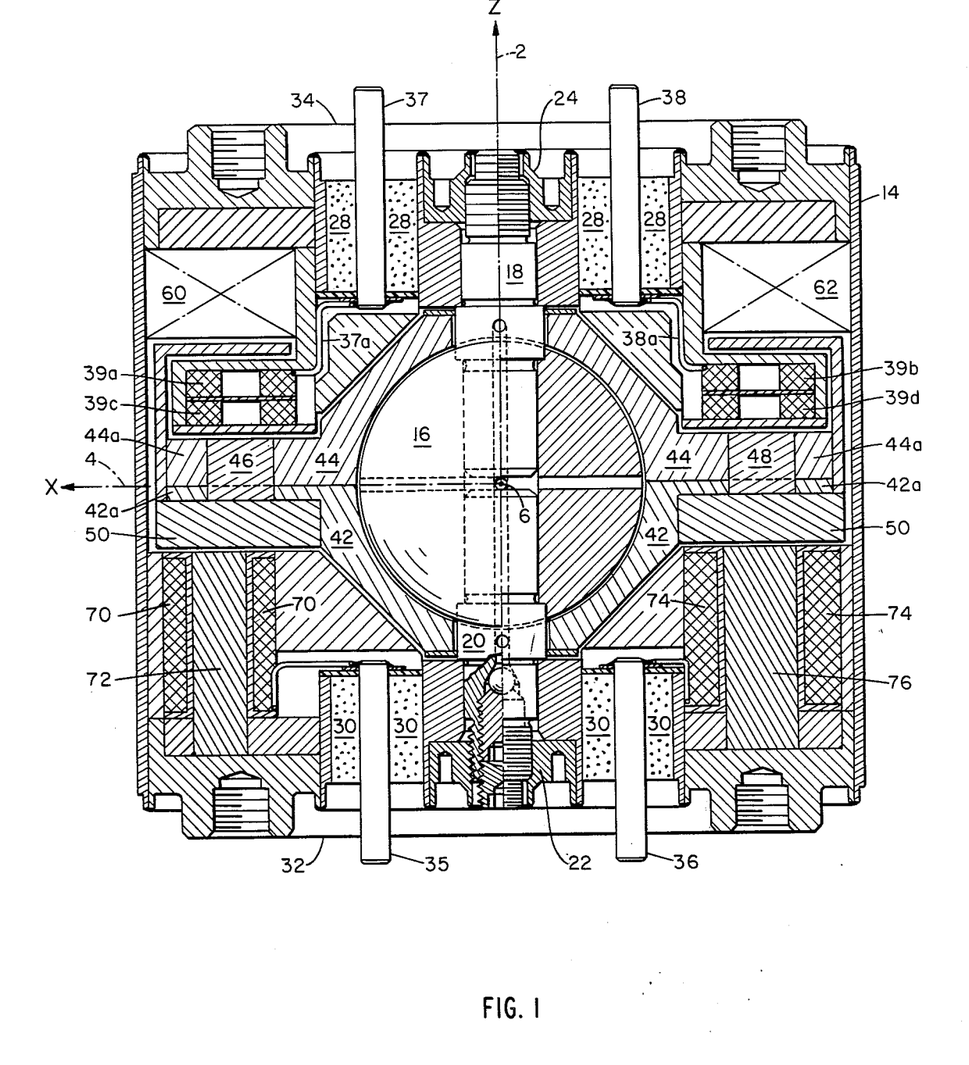
FIG. 1 shows in section an exemplary embodiment of the present invention.

FIG. 1 shows an exemplary embodiment in the present invention in the form of a free rotor gas bearing gyro 10. In the illustrated configuration, a spin reference (Z) axis is shown by the vertical line 2. A first (X) input axis, indicated by reference designation 4, and a second (Y) input axis, not shown, intersect with the Z axis at the point 6. The X, Y and Z axes are mutually orthogonal.

The gyro 10 includes a cylindrical outer casing or gyro housing 14. A stationary spherical ball 16 is rigidly coupled to the housing 14. In more detail, the ball 16 is supported by way of stub shafts 18 ad 20 which are press fit to the ball. The shafts 18 and 20 are secured by nuts 22 and 24 with recesses in hermetically sealed electrical pin headers 28 and 30. The headers in turn are connected by way of end housings 32 and 34, respectively, which in turn are welded to the outer casing 14. Electrical connections to the components of gyro 10 are provided by connector pins in headers 28 and 30. Pins 35–38 are shown in FIG. 1.

The housing 14 also includes a stator assembly rigidly connected thereto which includes two sets of series connected coils in quadrature. The sets of coils are referred to below as the "Phase A" set and "Phase B" set, respectively. In the present embodiment, each set includes twelve coils arranged in an annular configuration about the spin reference (Z) axis 2. Four coils (Phase A coils 39a and 39b and Phase B coils 39c and 39d) are shown in the sectional view of FIG. 1. The electrical connections to the Phase A coils 39a and 39b are indicated by the wires 37a and 37b from the pins 37 and 38, respectively.

An inertial wheel, or rotor encloses the spherical ball 16. The wheel is adapted for continuous rotation about a spin axis (which is shown as coaxial with the spin reference axis in FIG. 1) and for rotational displacements about the two input axes. The wheel is formed by hat-like members 42 and 44 which are joined to enclose the spherical ball 16. In the present embodiment, the members 42 and 44 inculde concave spherical inner surfaces which form the first bearing surface for a spherical bearing. The spherical ball 16 outer surface forms the other bearing surface for that gas bearing. The wheel assembly is adapted to spin about the spin axis on a film of gas as an autolubricated hydrodynamic gas bearing using conventional techniques. With this configuration, the support force generated by the spinning wheel assembly is substantial and serves to suspend and restrain the inertial member attached thereto in a very low friction manner. The wheel is restrained so that displacements along the X, Y and spin axes under the action of gravity and acceleration is relatively low, for example, in the order of a few micro-inches per pound of force. Since the mass of the spinning inertial element formed by wheel and the annular element member and ring described below, is relatively low compared with gas bearing stiffness, the element can sustain relatively high shock and steady acceleration without damage to the rotor touching the spherical ball. Thus, the wheel 40 is highly restrained with respect to linear motion along the X, Y and spin axes yet is free to rotate about the spin axis in a continuous manner and free to be rotationally displaced in a limited manner about the X and Y axes. Thus, the rotor provides a two degree of freedom element for the inertial measuring rotor element.

The peripheral portions 42a and 44a of the rotor 40 provide a support for a set of right circular cylindrical permanent magnets (two of which are denoted in FIG. 1 by reference designations 46 and 48) which are supported in a substantially annular pattern about the spin axis. The magnets are arranged so that their magnetic moments are substantially parallel to the spin axis and so that adjacent magnets have their magnetic moments oppositely directed. The rotor 40 further includes a relatively high permeability return ring member 50 attached to the periphery of portions 42a and 44a. The return ring 50 has a substantially "C" shaped cross section with a first section underlying and adjacent to one pole of each magnet, a second section overlying and adjacent to the face of the Phase A coils farthest from the magnets, and a third section connecting the first two portions.

The portions 42a and 44a support the set of magnets so that the annular pattern magnets underlies the annular pattern of the Phase A and Phase B coils in the stator assembly. The return ring 50 of the rotor 40 is also adapted in conjunction with the coils and the magnets to create a flux flow path for each magnet from one pole through the portion ring 50 closest to that magnet around to and in through the face of the Phase A coils farthest from the magnet, through Phase A and B coils, and out again from the face of the Phase B coils closest to the magnet to the other pole of the magnet, completing the magnetic circuit.

In operation, the flux from the magnets passes through the coils at right angles to the rotation of the magnets. As described in detail below in conjunction with FIG. 2, the stator coils are excited by a two-phase high frequency power supply by way of the electrical connections in the headers. The flux from the twelve magnets interacts with the two phase rotating field generated by the twelve Phase A coils and twelve Phase B coils to drive the rotor in synchronism with the power supply.

The gyro assembly 10 also includes sensor assemblies to detect rotational displacement of the rotor about the X and Y axes. In the exemplary embodiment of FIG. 1, conventional form capacitive sensors 60 and 62 provide signals representative of the gap between the conduction plates on the lowermost portions of the respective sensors and the ring 50, and thus provide representations of the rotation of the rotor about the Y axis. The signals from sensors 60 and 62 are coupled to pins (not shown) in the header 28. Similar sensors (not shown) are arranged along the Y axis to detect rotation about the X axis. In alternative embodiments, the sensors may use optical or Hall-effect pick-offs, rather than capacitive pickoffs.

The gyro assembly 10 also includes electrical forcers, or torquers, to displace the rotor in response to the detected rotation of the rotor. FIG. 1 shows a pair of solenoid torquers for nulling displacements about the Y axis. The first of these torquers includes a coil 70 wound about a core 72 and the second includes a coil 74 wound about a core 76. The coils 70 and 74 are coupled (by way of pins in header 30) to external, conventional form torque-to-balance-loop networks (not shown), which in turn are coupled (by way of pins in header 28) to the sensors 60 and 62, respectively. Similar torquers (not shown) are arranged along the Y axis and are similarly coupled by way of torque-to-balance networks to the sensors along the Y axis. With these closed loop torque-to-balance configurations, rotational displacements of rotor about the X and Y axes may be continuously nulled.

In operation, the gyro 10 measures angular velocities of the body to which the housing 14 is attached. The rates are referenced to the X and Y axis. Whenever gyro 10 moves about the input X and Y axes, the following sequence takes place. The angular momentum of the spinning rotor interacts with the angular velocity to which the case 14 is subjected. The resulting torque precesses the rotor about either or both of the X and Y axes. The X and Y axis sensors (which are fixed to the housing 14) generate error signals representative of the displacement of the rotor 40 relative to the sensors and apply those signals to the external torque-to-balance networks. The resultant signals are then applied to the torquers to generate magnetic flux which acts on the magnetic material of ring 50. In various embodiments, the feedback current to the torquers may be in a.c., d.c., or analog or pulsed form.

The closed loop servo action of the feedback controls the torque generated by the torquers to offset the precessional torques on the rotor generated by the rotation of gyro 10, so that the spinning rotor is maintained in a plane normal to the Z (or spin referencce) axis. An output signal representative of the torquer currents required to hold the rotor at null is used as the output of gyro 10. This signal may be measured and calibrated so that the gyro 10 acts as a rate gyro and that the measured current is proportional to the angular velocity of the housing 14. While in the present embodiment, the torquers are iron-cored, alternative embodiments may use conventional D'Arsonval or microsyn torquers.

Figure 2:
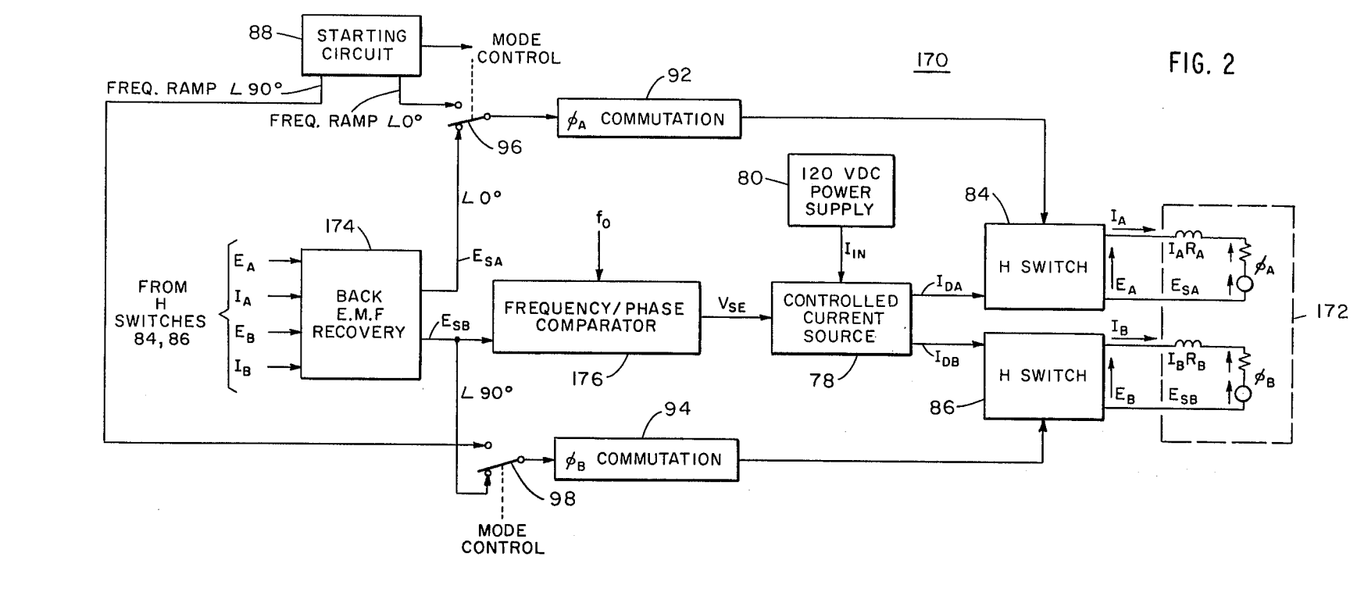
FIG. 2 shows in block diagram form, an exemplary control network for the axial gap permanent magnet motor of the embodiment of FIG. 1.

FIG. 2 shows an exemplary control network 170 for the rotor spin motor of the gyro 10. In that figure, the motor is denoted by reference designation 172. The control network 170 also includes back emf recovery network 174, frequency/phase comparator network 176, controlled current source 78, 120 VDC power supply 80. Phase A and Phase B "H" switches 84 and 86, starting network 88, Phase A and Phase B commutation networks 92 and 94 and ganged mode control switches 96 and 98.

In operation, with switches 96 and 98 in the "normal run" mode position (as shown in FIG. 2), recovery network 174 detects the back emf ($E_{SA}$ and $E_{SB}$) for the Phase A coils and Phase B coils from the voltages $E_A$ and $E_B$ across the respective coils and the currents $I_A$ and $I_B$ through the respective coils. Comparator 176 generates a speed error voltage $V_{SE}$ by squaring up $E_{SB}$ and phase locking the resultant signal to a reference frequency signal $f_o$. The current source 78 controls the magnitude of the Phase A and Phase B coil drive currents ($I_{DA}$ and $I_{DB}$) applied to the respective H switches to have amplitudes proportional to the speed error voltage ($V_{SE}$).

The back emf signals $E_{SA}$ and $E_{SB}$ are applied to the commutation networks 92 and 94. These networks 92 and 94 use these signals to commutate the motor 172 by controlling the action of H switches 84 and 86 so that the Phase A and Phase B currents ($I_A$ and $I_B$) lead the magnetic flux by 90° in the respective coils. This is achieved by controlling the coil current to be in phase with the detected back emf for the respective coils. With this configuration, the motor is commutated at a 90° torque angle.

With the mode control switches 96 and 98 in the "start-up" position, the starting circuit 88 provides initial drive signals for the rotor, since at start-up there is no back emf. The starting circuit 88 uses a digitally generated frequency ramp to drive the rotor up to relatively low speed, e.g. 20% of the nominal running speed, at which point there is sufficient back emf so the control system 170 can be switched over from the "start-up mode" to the "normal run" mode.

Figure 3:
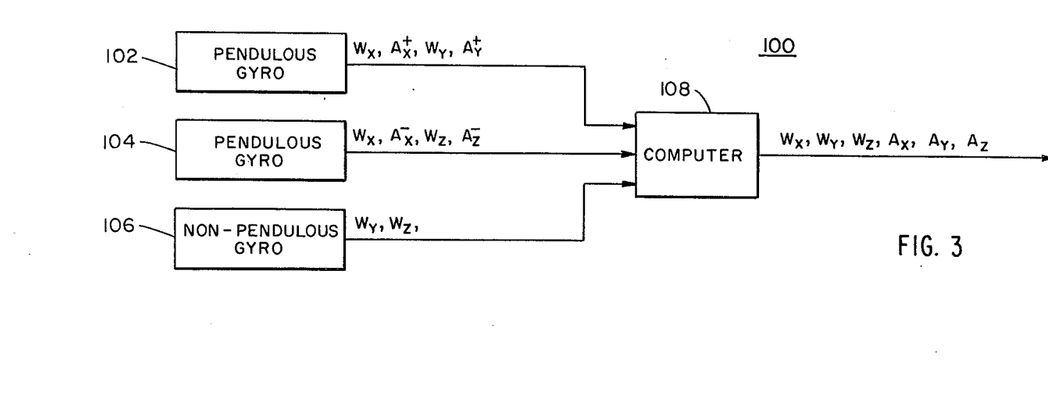
FIG. 3 shows in block diagram form, an exemplary two axis accelerometer according to the present invention.

FIG. 3 shows a linear accelerometer 100 in block diagram form in accordance with the present invention. The accelerometer 100 includes two pendulous gyros 102 and 104 and a non-pendulous gyro 106 coupled to a platform in a strapdown configuration with respect to a set of orthogonal axes, X', Y' and Z'. The non-pendulous gyro 106 is substantially similar to the gyro 10 shown in FIG. 1 with its spin reference axis being aligned with the Z' axis. The pendulous gyros 102 and 104 are also similar to the gyro configuration of FIG. 1, except that the rotor assemblies are pendulous (i.e. unbalanced) about the two axes. With this configuration, each of gyros 102 and 104 is a two-axis linear acceleration sensor. The gyro 102 has its spin reference axis aligned with the Z' axis, with its rotor being pendulous about the X' and Y' axis. The gyro 104 has its spin reference axis aligned with the Y' axis, with its rotor being pendulous about the X' and Z' axes.

In the preferred embodiment, the pendulous rotors are provided by constructing the rotor portions corresponding to portions 42 and 44 of gyro 10 out of different density materials. With such construction, the resultant rotors are sensitive to linear accelerations along the X' and Y' axes for gyro 102 and the X' and Z' axes for gyro 104. In all three gyros, 102, 104 and 106, the rotor position sensors, the torque-to-balance networks, and torquers are substantially identical to the corresponding elements of gyro 10.

The accelerometer 100 also includes a computer 108 programmed to perform computations and generate an output signal as defined more fully below.

In the configuration of FIG. 3, the two pendulous gyros 102 and 104 and the non-pendulous gyro 106 operate simultaneously. The gyros 102 and 104 are arranged so that the acceleration portion of the output signals are opposite in sign for a given direction of linear acceleration (i.e. the gyros 102 and 104 have opposite polarities). With the present configuration, the pendulous gyro 102 provides a signal representative of linear accelerations $A_x+$ and $A_y+$, respectively, of accelerometer 100 along the X' and Y' axes, and in addition, representative of the angular velocities ($W_X$ and $W_Y$, respectively) of accelerometer 100 about the X' and Z' axes. The pendulous gyro 104 provides an inverted signal representative of linear accelerations ($A_x-$ and $A_z-$, respectively) of accelerometer 100 along the X' and Z' axes, and in addition, angular velocities ($W_X$ and $W_Z$, respectively) of accelerometer 100 about the X' and Z' axes. The non-pendulous gyro 106 provides an output signals representative of the angular velocities ($W_Y$ and $W_Z$, respectively) of accelerometer 100 about the Y' and Z' axes, respectively. These output signals from gyros 102, 104 and 106 are applied to the computer 108. Computer 108 is responsive to these signals to perform a conventional matrix computation which separates and identifies the angular velocity and acceleration components with respect to the X', Y' and Z' axes. Accordingly, the configuration of FIG. 3 provides a three sensor strapdown package consisting of the non-pendulous two-axis gyro 106 and two pendulous two-axis gyros 102 and 104 (with opposite polarities) which can be mounted together in a minimum strapdown configuration. This configuration is an improvement over the prior art in that the sensitive acceleration element, the spinning rotor or wheel, is suspended on a relatively low noise, hydrodynamic gas bearing, and is driven by a motor that has no inherent magnetic attractive force which can disturb the pendulous element. Therefore, a higher capability for low levels of acceleration measurement can be achieved.

Figure 4:
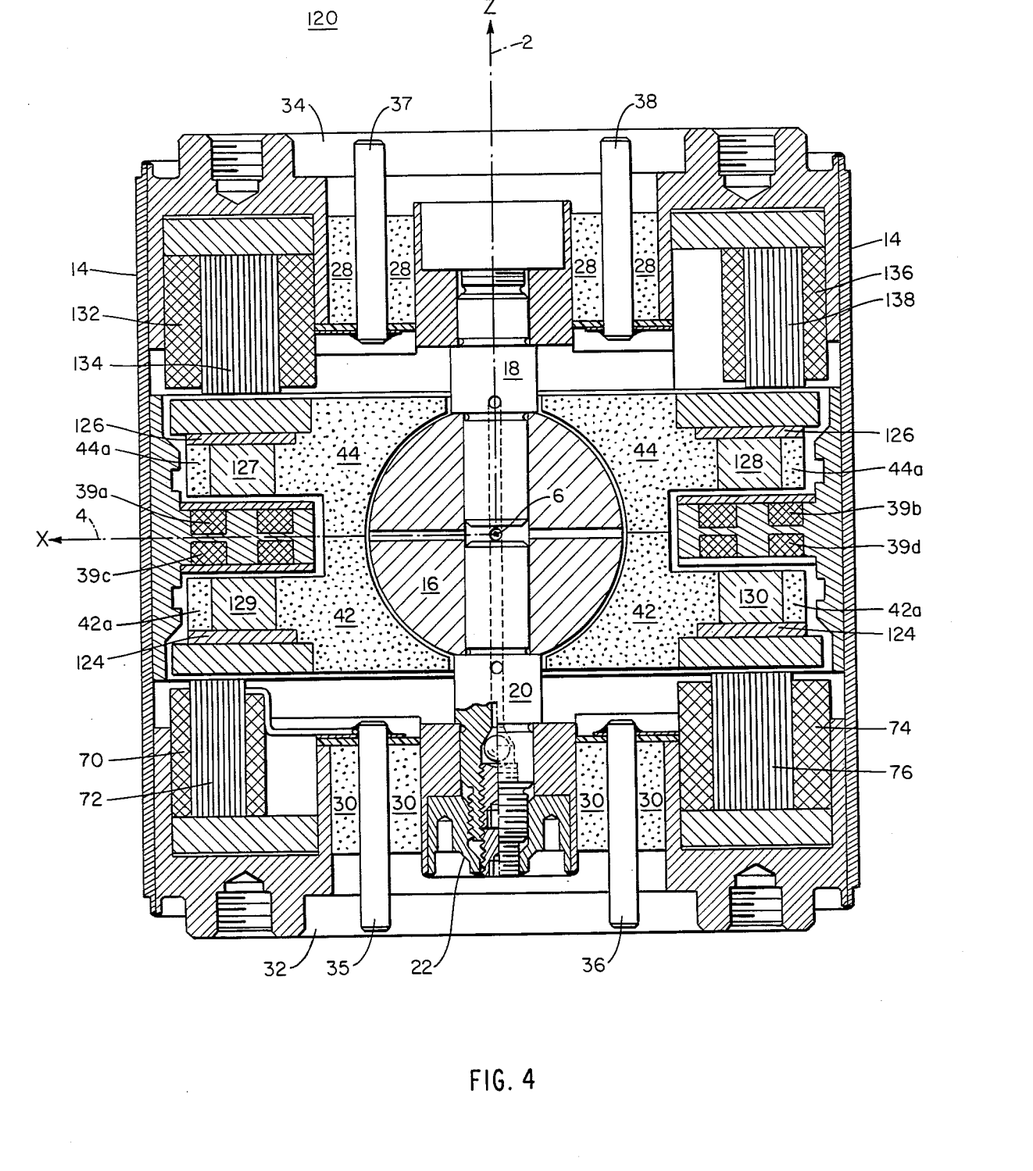
FIG. 4 shows in section another preferred form of the present invention.

FIG. 4 shows an alternative embodiment 120 for the gyro 10. In that figure, elements having corresponding elements in the FIG. 1 embodiment are denoted with identical reference numerals. Basically, the embodiment of FIG. 4 is an embodiment which is substantially symmetrical about the X-Y plane defined by the X and Y axes. The stator includes two sets of series coils, as in gyro 10, with each set having an annular distribution about the Z (or spin reference) axis and with the two sets being arranged in quadrature. In the present embodiment, as shown in FIG. 4, the Phase A coils are above the X-Y plane, and the Phase B coils are below that plane. Coils 39a-d are shown in FIG. 4.

The gyro 120 includes two sets of right circular cylindrical permanent magnets, with each set being arranged in an annular configuration about the spin axis. In this embodiment, each set contains the same number of magnets. The magnetic moments of each magnet are parallel to the spin axis and the moments of adjacent magnets within a set are oppositely directed. The portion 44a of member 44 supports the one set of magnets between the Phase A coils and an annular, relatively high permeability return ring member 126 and the portion 42a of member 42 supports the other set of magnets between the Phase B coils and an annular, relatively high permeability ring member 124. Portions 42a and 44a support the magnets so that each magnet in one set is coaxial with an associated magnet in the other set, and so that each pair of associate magnets have magnetic moments in the same direction. Magnets 127-130 are shown in the sectional view of FIG. 4. With this configuration, magnetic circuits are established with a flux path extending from one magnet, through the Phase A and Phase B coils, through the other magnet, through a portion of the return ring adjacent to the latter magnet, through the adjacent magnet-coil-magnet combinations, and back through a portion of the other return ring to the originally noted magnet.

In addition to the torquers formed by coils 70 and 74 (and associated cores 72 and 76, respectively), the gyro 120 also includes additional torquers formed by coil 132 (and associated core 134) and coil 136 (and associated core 138), as well as corresponding additional torquers along the Y axis (not shown in FIG. 4). Gyro 120 also includes sensors for generating signals representative of the angular displacements of the rotor about the X and Y axes. By way of example, these sensors may be a bridge configuration having metalized film pick-offs on opposing surfaces of the rotor and stator.

Generally, the configuration of FIG. 4 operates in a manner similar to gyro 10, but gyro 120 provides twice the torquing capability of the FIG. 1 configuration. Due to the symmetrical configuration of gyro 120 various uncertainty parameters are averaged and fewer separate piece-parts are required.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A two degree of freedom gyro comprising:
A. a stator including two sets of series connected coils wound in quadrature, each set of coils being disposed in a substantially annular configuration about a spin reference axis and substantially parallel to a plane defined by first and second input axes, said first and second input axes and said spin reference axis being mutually orthogonal and having a common point of intersection, wherein the axis of each coil is substantially parallel to said spin reference axis,
B. a rotor adapted for rotation about a spin axis, and adapted for rotational displacements about said first and second input axes, said rotor including a set of permanent magnets disposed in a substantially annular configuration about said spin axis, said annular configuration of magnets having substantially the same mean radius as said annular configuration of coils, and wherein the magnetic moment of each of said magnets substantially parallel to said spin axis, and wherein the magnetic moments of adjacent magnets in said set are oppositely directed,
C. means for positioning said rotor with respect to said stator whereby said annular configuration of magnets is adjacent to said annular configuration of coils so that magnetic flux from said magnets is coupled to said coils,
D. return means connected to said rotor for establishing a magnetic flux return path therein, said return path completing a circuitous path for magnetic flux passing through said coils,
E. means for exciting said sets of coils including servo means for detecting back emf in said sets of coils and for generating control signals related thereto for driving alternating currents in the respective sets of coils, said currents having a 90° relative phase shift and being in-phase with the detected back emf for the respective sets of coils,
F. first and second means for detecting rotational displacements of said rotor about said first and second input axes, respectively, relative to said stator, and for generating first and second balance control signals representative thereof, and
G. first and second torquer means connected to said housing member and responsive to said first and second balance control signals for applying torque to said rotor about said first and second input axes, respectively, whereby said spin reference and spin axes are maintained substantially coaxial.

2. A gyro according to claim 1 wherein said magnets are entirely on one side of said sets of coils, and wherein said return means includes a first relatively high permeability section coupled to the poles of said magnets farthest from said coils, and a second relatively high permeability section adjacent to the faces of the coils farthest from the magnets.

3. A gyro according to claim 2 wherein said return means further includes a third relatively high permeability section connecting said first and second sections.

4. A gyro according to claim 1, wherein each of said magnets includes a first permanent magnet element on a first side of said set of coils and a second permanent magnet element on the second side of said set of coils, said first and second elements of each of said magnets having commonly directed, coaxial magnetic moments, and wherein said return means includes a first relatively high permeability section coupled to the poles of said first magnet elements farthest from said coils, and a second relatively high permeability section coupled to the poles of said second magnetic elements farthest from the coils.

5. A gyro according to claim 1 further comprising a gas bearing for coupling said rotor and said stator, said gas bearing including a hollow outer member disposed about an inner member, wherein said rotor includes an annular ring member disposed about said spin axis and connected to said bearing outer member, said outer member having a substantially spherical concave inner surface with the center of curvature thereof located at the point of intersection of said first and second input axes and said spin reference axis, said ring member including means for supporting said magnets, wherein said stator includes said bearing inner member, said inner member having a substantially spherical outer surface which has a smaller radius of curvature than said inner surface of said bearing outer member, and further including gas means for maintaining a gas medium between said inner and outer members.

6. A gyro according to claim 1 further comprising a gas bearing for coupling said rotor and said stator, said gas bearing including a hollow outer member disposed about an inner member, said outer member having a substantially spherical concave inner surface with the center of curvature thereof located at the point of intersection of said first and second input axes and said spin reference axis, wherein said stator includes said bearing inner member, said inner member having a substantially spherical outer surface which has a smaller radius of curvature than said inner surface of said bearing outer member, and further including gas means for maintaining a gas medium between said inner and outer members.

7. A gyro according to claim 1 wherein said rotor is non-pendulous.

8. A gyro according to claim 1 wherein said rotor is pendulous, said rotor having a mass imbalance along said spin axis.

9. An accelerometer comprising first, second, and third two degree of freedom gyros coupled to a platform and a computing means, wherein each of said gyros comprises:

A. a stator including two sets of series connected coils wound in quadrature, each set of coils being disposed in a substantially annular configuration about a spin reference axis and substantially parallel to a plane defined by first and second input axes, said first and second input axes and said spin reference axis being mutually orthogonal and having a common point of intersection, wherein the axis of each coil is substantially parallel to said spin reference axis, B. a rotor adapted for rotation about a spin axis, and adapted for rotational displacements about said first and second input axes, said rotor including a set of permanent magnets disposed in a substantially annular configuration about said spin axis, said annular configuration of magnets having substantially the same mean radius as said annular configuration of coils, and wherein the magnetic moment of each of said magnets is substantially parallel to said spin axis, and wherein the magnetic moments of adjacent magnets in said set are oppositely directed, C. means for positioning said rotor with respect to said stator whereby said annular configuration of magnets is adjacent to said annular configuration of coils so that magnetic flux from said magnets is coupled to said coils, D. return means connected to said rotor for establishing a magnetic flux return path therein, said return path completing a circuitous path for magnetic flux passing through said coils, E. means for exciting said sets of coils including servo means for detecting back emf in said sets of coils and for generating control signals related thereto for driving alternating currents in the respective sets of coils, said currents having a 90° relative phase shift and being in-phase with the detected back emf for the respective sets of coils, F. first and second means for detecting rotational displacements of said rotor about said first and second input axis, respectively, relative to said stator, and for generating first and second balance control signals representative thereof, and G. first and second torquer means connected to said housing member and responsive to said first and second balance control signals for applying torque to said rotor about said first and second input axes, respectively, whereby said spin reference and spin axes are maintained substantially coaxial, wherein the spin reference axis of said first gyro is aligned with a first reference axis and the rotor of said first gyro is non-pendulous, and said first gyro includes means for generating a first gyro signal representative of the angular velocity of said platform about second and third reference axes, said first, second and third reference axes being mutually orthogonal, wherein the spin reference axis of said second gyro is aligned with said second reference axis and the rotor of said second gyro is pendulous, and said second gyro includes means for generating a second gyro signal representative of the angular velocity of said platform about said first and third reference axes and the linear acceleration of said platform along said first and third reference axes, wherein the spin reference axes of said third gyro is aligned with said third reference axis and the rotor of said third gyro is pendulous, and said third gyro includes means for generating a third gyro signal representative of the angular velocity of said platform about said first and second reference axes and the linear acceleration of said platform along said first and second reference axes, said acceleration portion of said third gyro signal being opposite in polarity from the corresponding portion of said second gyro signal, and wherein said computing means is responsive to said first, second and third gyro signals to generate separate output signals representative of the acceleration and angular velocity of said platform with respect to each of said first, second, and third reference axes.

10. An accelerometer according to claim 9 wherein the pendulous rotors of said second and third gyros each have mass imbalances along the spin axis of the respective rotor.

11. An accelerometer according to claim 9 wherein each of said gyros further comprises:

gas bearing for coupling said rotor and said stator, said gas bearing including a hollow outer member disposed about an inner member, said outer member having a substantially spherical concave inner surface with the center of curvature thereof located at the point of intersection of said first and second input axes and said spin reference axis, wherein said stator includes said bearing inner member, said inner member having a substantially spherical outer surface which has a smaller radius of curvature than said inner surface of said bearing outer member, and further including gas means for maintaining a gas medium between said inner and outer members.

* * * * *